June 18, 1929.　　　S. H. PERKY　　　1,717,401

FOOD PRODUCT

Filed May 1, 1922

Inventor
Scott H. Perky

By John W. Darley
Attorney

Patented June 18, 1929.

1,717,401

UNITED STATES PATENT OFFICE.

SCOTT H. PERKY, OF SUMMIT, NEW JERSEY.

FOOD PRODUCT.

Application filed May 1, 1922. Serial No. 557,544.

My invention relates to food products.

Among the objects of my invention are:—

To devise a new food product which shall be pleasing and appetizing in appearance; which shall be of such a texture that it can be readily masticated and thoroughly permeated by the saliva and other digestants; which shall be of such a texture that it will support without fracture the shocks due to packing and shipping and which shall be of such a texture that all parts of same may be equally dried or baked.

To devise a process for producing a food product having the above characteristics and which, in addition, can be fabricated from a large number of materials at a low cost.

These and other objects and advantages of my invention will appear in the following specification, reference being had to the accompanying drawing, and will be more particularly pointed out in the claim.

Figure 1:
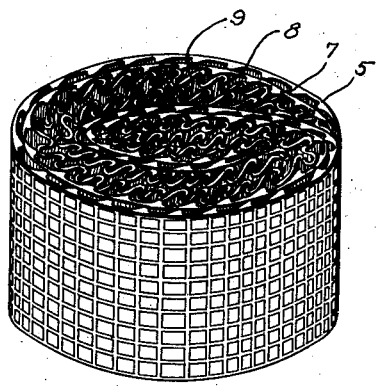
Figure 1 is a perspective view of my improved product.

In carrying out my invention, I first place a layer of material 5 upon the support 6 and then place a second layer 7 upon the layer 5.

The layers 5 and 7 may be formed as plain flat ribbons or they may be made in the form of a ribbon that is corrugated, imbricated, castellated or embossed or shaped in any manner so that there will be interstices through the body of the ribbon. The particular texture that is given to the body of the ribbons may be varied.

After the ribbons 5 and 7 are superimposed, I then place upon the ribbon 7 a ribbon 8 which is folded as shown, or arranged in any manner so that its contact with the ribbon 7 will be discontinuous. I then place upon the ribbon 8 a ribbon 9 which is preferably folded as shown.

Figure 2:
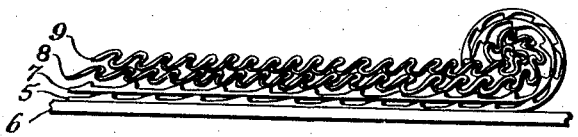
Fig. 2 shows a stage in the process of making my improved product.

After the layers are superimposed, as just explained, I then begin as at the right end in Fig. 2 and roll the ribbons into the form of a cylinder as shown in Fig. 1.

Figure 3:
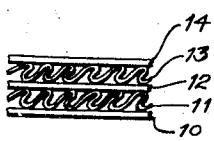
Fig. 3 shows a variation in the formation of my improved product.

While I have shown a plain ribbon 7 superimposed upon the plain ribbon 5 and the sections 8 and 9 of a folded ribbon, yet it is to be understood that my product can be made with other combinations such, for instance, as that shown in Fig. 3 in which there is a plain ribbon 10, a folded ribbon 11, a plain ribbon 12, a folded ribbon 13 and a plain ribbon 14.

It is also to be understood that there may be any number of superposed plain and folded ribbons; also, that the shaping and superposition of the ribbons into the form of a cylinder shown in Fig. 1 may be omitted or they may be shaped into any other form desired.

After the ribbons are superimposed they may be dried or baked by removal to a drying or baking oven, or they may be treated in any approved manner to prepare the same for the market, or they may shaped into any form desired and then dried or baked or treated in any manner to prepare the same for the market.

The material from which my improved product is formed is preferably reduced to a plastic condition in any approved manner and formed into a ribbon by the use of rolls or other forming mechanism. The sections of the ribbons are then superimposed, certain of the sections being left as they leave the rolls and other sections being folded or corrugated as desired. After the superposition of the sections of the ribbon, the ribbons may be shaped as already explained.

It is to be noted that by using two or more plain ribbons such as 5 and 7 which form the outer layers of the cylinder shown in Fig. 1, I greatly strengthen the food product and increase its ability to stand the shocks occurring during shipment.

By folding the sections 8 and 9 of the ribbon, I insure that during the drying or baking process every part of the food product will be thoroughly dried or baked; also that the product is rendered more capable of absorbing cream or sauces and more permeable to the saliva and other digestive juices. The folding of the sections 8 and 9 of the ribbon also renders mastication of the food product easier, and gives the formed product suitable bulk.

I consider any food product having sections of plain ribbon alternating with sections of folded or corrugated ribbon or ribbon otherwise treated so that its contact with the section of plain ribbon will be discontinuous to be within the scope of my invention.

It is also to be noted that by superimposing a plurality of sections of ribbon preparatory to the forming operation, I am enabled to greatly increase the rapidity of production of my improved food product.

Hence, I consider any food product that is composed of a plurality of superimposed sections of ribbon which are afterwards rolled into a cylinder or shaped into other forms to be within the scope of my invention.

While I have shown certain embodiments of my invention, it is to be understood that these are for purposes of illustration only and not intended to limit the scope thereof, for many variations may be made in the forms of the ribbons, the orders in which they are superimposed and the forms into which they are afterwards shaped without departing from the spirit of my invention.

I claim:—

A food product consisting of the contiguous convolutions of a plurality of juxtaposed plain and folded ribbons, said plain ribbons being alternately disposed to said folded ribbons.

In testimony whereof, I affix my signature.

SCOTT H. PERKY.